(12) United States Patent
Lee et al.

(10) Patent No.: US 10,901,130 B2
(45) Date of Patent: *Jan. 26, 2021

(54) OPTICAL FILM, POLARIZING PLATE INCLUDING THE OPTICAL FILM, AND LIQUID CRYSTAL DISPLAY APPARATUS INCLUDING THE POLARIZING PLATE

(71) Applicant: Samsung SDI Co., Ltd., Yongin-si (KR)

(72) Inventors: Dae Gyu Lee, Suwon-si (KR); Yong Un Jung, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 151 days.

This patent is subject to a terminal disclaimer.

(21) Appl. No.: 16/155,755

(22) Filed: Oct. 9, 2018

(65) Prior Publication Data

US 2019/0129079 A1 May 2, 2019

(30) Foreign Application Priority Data

Nov. 1, 2017 (KR) .................. 10-2017-0144980
Aug. 1, 2018 (KR) .................. 10-2018-0089938

(51) Int. Cl.
*G02F 1/1335* (2006.01)
*G02B 5/30* (2006.01)
*G02B 1/14* (2015.01)

(52) U.S. Cl.
CPC ............. *G02B 5/305* (2013.01); *G02B 1/14* (2015.01); *G02B 5/3083* (2013.01);
(Continued)

(58) Field of Classification Search
CPC ...... G02B 1/14; G02B 5/0236; G02B 5/0294; G02B 5/205; G02B 5/223; G02B 5/305;
(Continued)

(56) References Cited

U.S. PATENT DOCUMENTS

2005/0037279 A1   2/2005   Miyako et al.
2016/0252665 A1*  9/2016   Lee .................. G02B 5/3083
                                                                    359/489.07
2019/0187349 A1*  6/2019   Lee .................. G02F 1/133528

FOREIGN PATENT DOCUMENTS

CN    101821650 A    9/2010
JP    2006-251659 A  9/2006
(Continued)

OTHER PUBLICATIONS

Korean Intellectual Property Office Action issued in corresponding Korean Patent Application No. 10-2017-0175591, dated May 1, 2020, 4 pages.

(Continued)

*Primary Examiner* — Sophie Hon
(74) *Attorney, Agent, or Firm* — Lewis Roca Rothgerber Christie LLP (57) ABSTRACT

An optical film includes: a protective layer; and a contrast ratio improvement layer including a first resin layer and a second resin layer facing the first resin layer, the second resin layer and the first resin layer being sequentially stacked from a lower surface of the protective layer, wherein the second resin layer has a refractive index greater than that of the first resin layer. The first resin layer has a patterned portion with at least two embossed optical patterns and flat sections immediately adjacent to and between the embossed optical patterns. The patterned section is in at least a portion thereof facing the second resin layer. A polarizing plate including the optical film and a liquid crystal display apparatus including the polarizing plate are also provided.

19 Claims, 3 Drawing Sheets

(52) U.S. Cl.
CPC .. *G02F 1/133502* (2013.01); *G02F 1/133528* (2013.01); *C09K 2323/031* (2020.08)

(58) Field of Classification Search
CPC ............ G02B 5/3083; G02F 1/133502; G02F 1/133528; G02F 1/133509; G02F 2203/023; Y10T 428/1041; C09K 2323/031
USPC ....................................................... 428/1.31
See application file for complete search history.

(56) References Cited

FOREIGN PATENT DOCUMENTS

| | | |
|---|---|---|
| KR | 10-0220494 B1 | 9/1999 |
| KR | 10-2010-0091977 A | 8/2010 |
| KR | 10-1659241 B1 | 9/2016 |
| KR | 10-2017-0122611 A | 11/2017 |
| TW | 214562 B | 10/1993 |
| TW | 200524997 A | 8/2005 |
| TW | 201631340 A | 9/2016 |
| WO | WO 2016/175580 A1 | 11/2016 |

OTHER PUBLICATIONS

Taiwan Patent Office Action issued in corresponding Taiwan Patent Application No. 107139056, dated May 23, 2019, 7 pages.
Office Action from corresponding China Application No. 201811283755.1, China Office Action dated Nov. 19, 2020 (7 pgs.).

* cited by examiner

OPTICAL FILM, POLARIZING PLATE INCLUDING THE OPTICAL FILM, AND LIQUID CRYSTAL DISPLAY APPARATUS INCLUDING THE POLARIZING PLATE

CROSS-REFERENCE TO RELATED APPLICATION

This application claims priority to and the benefit of Korean Patent Application No. 10-2017-0144980, filed on Nov. 1, 2017 and Korean Patent Application No. 10-2018-0089938, filed on Aug. 1, 2018, the entire content of each of which is incorporated herein by reference.

BACKGROUND

1. Field

One or more aspects of example embodiments of the present disclosure are related to an optical film, a polarizing plate including the optical film, and a liquid crystal display apparatus including the polarizing plate.

2. Description of the Related Art

A liquid crystal display (LCD) apparatus is operated in such a manner that light from a backlight unit is emitted (transmitted) through a liquid crystal panel. The light from the backlight unit is perpendicularly (normally) incident to a screen of the liquid crystal display apparatus. As a result, a contrast ratio (CR) on a side surface of the liquid crystal display apparatus (e.g., the side contrast ratio) is lower than that on a front surface of the liquid crystal display apparatus (e.g., the front contrast ratio). Therefore, development of an optical film for improving a contrast ratio, including the side contrast ratio, is being conducted.

An optical film includes an optical pattern, a high refractive index layer, and a low refractive index layer to improve a side contrast ratio. The side contrast ratio may be improved by the optical pattern, which includes a flat section and an embossed optical pattern that are alternatively formed. However, although the contrast ratio on the side surface is somewhat improved by the optical film, when light emitted to the front surface is disturbed by the optical pattern, the front contrast ratio is reduced. Further, external light is incident on the optical pattern even when an optical display device is not driven, resulting in an increase in reflectance.

SUMMARY

One or more aspects of example embodiments of the present disclosure are directed toward an optical film that is capable of improving a contrast ratio on a front surface (e.g., the front contrast ratio), increasing a viewing angle, and lowering reflectance.

One or more aspects of example embodiments of the present disclosure are directed toward an optical film that is capable of lowering a degree of a color shift on side surfaces.

One or more aspects of example embodiments of the present disclosure are directed toward an optical film that has an excellent external appearance when a composition for a high refractive index layer is well cured, thereby minimizing or reducing separation of a dye from the high refractive index layer.

One or more aspects of example embodiments of the present disclosure are directed toward an optical film that has an excellent external appearance when a composition for a low refractive index layer is well cured, thereby minimizing or reducing separation of a dye from the low refractive index layer.

One or more aspects of example embodiments of the present disclosure are directed toward an optical film that is capable of lowering light leakage to the side surfaces, and improving a black mode contrast ratio by reducing the amount of light that is emitted to the side surfaces in black mode.

One or more aspects of example embodiments of the present disclosure are directed toward an optical film including a second resin layer to improve brightness, and which has high light transmittance despite including a dye.

One or more aspects of example embodiments of the present disclosure are directed toward a polarizing plate and an optical display device including the optical film according to embodiments of the present disclosure.

According to one or more example embodiments of the present disclosure, an optical film includes a protective layer and a contrast ratio improvement layer, the contrast ratio improvement layer including a first resin layer and a second resin layer facing the first resin layer, the second resin layer and the first resin layer being sequentially stacked from a lower surface of the protective layer, wherein the second resin layer has a refractive index greater than that of the first resin layer. The first resin layer has a patterned portion with at least two embossed optical patterns and flat sections between and immediately adjacent to the embossed optical patterns, the patterned portion being in at least a portion thereof facing the second resin layer. A corresponding one of the embossed optical patterns has a base angle ($\theta$) of about 75° to about 90°, and the patterned portion satisfies Expression 1:

$$1 < P/W \leq 10, \qquad \text{Expression 1}$$

wherein, in Expression 1,

P is a pitch (unit: μm) of the patterned portion, and

W is a maximum width (unit: μm) of the embossed optical pattern.

The first resin layer and/or the second resin layer includes a metal complex dye and/or an organic black dye.

According to one or more example embodiments of the present disclosure, a polarizing plate includes a polarizing film and the optical film, the optical film being on the polarizing film.

According to one or more example embodiments of the present disclosure, a liquid crystal display apparatus includes the polarizing plate.

BRIEF DESCRIPTION OF THE DRAWINGS

The above and other objects, features and advantages of the present disclosure will become more apparent to those of ordinary skill in the art by describing example embodiments thereof in more detail with reference to the accompanying drawings, in which.

DETAILED DESCRIPTION

Example embodiments will be described in more detail with reference to the accompanying drawings to provide a thorough understanding of the disclosure to those skilled in the art. It should be understood that the present disclosure may be embodied in different ways, and is not limited to the described embodiments. In the drawings, portions irrelevant to the description may be omitted for clarity. Like components will be denoted by like reference numerals throughout the specification, and duplicative descriptions thereof may not be provided.

In the drawings, the thicknesses of layers, films, panels, regions, etc., may be exaggerated for clarity. As used herein, spatially relative terms such as "upper" and "lower" are defined with reference to the accompanying drawings. Thus, it will be understood that "upper" can be used interchangeably with "lower", and "lower" can be used interchangeably with "upper". It will be understood that when a layer or element is referred to as being "on" another layer or element, it can be directly formed on the other layer or element, or intervening layer(s) or element(s) may also be present. In contrast, when a layer or element is referred to as being "directly on" another layer or element, no intervening layers or elements are present.

Expressions such as "at least one of", "one of", "selected from", "at least one selected from", and "one selected from", when preceding a list of elements, modify the entire list of elements and do not modify the individual elements of the list. Further, the use of "may" when describing embodiments of the disclosure refers to "one or more embodiments of the disclosure."

As used herein, the terms "horizontal direction" and "vertical direction" refer to a transverse direction and a longitudinal direction of a rectangular screen of a liquid crystal display, respectively. As used herein, the term "side surface" refers to a region in which θ ranges from 0° to 30° or from 0° to 60° in the spherical coordinate system represented by (ϕ, θ). The term "front" refers to a region indicated by (0°, 0°), a left end point is indicated by (180°, 90°), and a right end point is indicated by (0°, 90°) with reference to the horizontal direction.

As used herein, the term "top part" refers to a portion located at an uppermost portion of an embossed optical pattern.

As used herein, the term "aspect ratio" refers to a ratio of maximum height of an embossed optical pattern to a maximum width thereof (maximum height/maximum width).

As used herein, the term "pitch" refers to the distance between adjacent embossed optical patterns, for example, the sum of a maximum width of one optical pattern and a width of one flat section immediately adjacent to the optical pattern.

As used herein, the term "in-plane retardation (Re)" is a value at a wavelength of 550 nm and is represented by Expression A:

$$Re = (nx - ny) \times d. \quad \text{Expression A}$$

In Expression A, nx and ny are the refractive indexes at a wavelength of 550 nm in a slow axis direction and a fast axis direction of a corresponding protective layer or base layer, respectively, and d is a thickness of the corresponding protective layer or base layer (unit: nm).

As used herein, the term "(meth)acryl" refers to acryl and/or methacryl.

When a metal complex dye and/or an organic black dye is added to a first resin layer and/or a second resin layer in an optical film, where the optical film includes a patterned portion, a contrast ratio on the front surface (e.g., front contrast ratio) may be improved, reflectance may be lowered, a viewing angle may be improved, and a degree of a color shift on the side surfaces may be lowered, without affecting an improvement in contrast ratio on the side surfaces (e.g., side contrast ratio) by the patterned portion.

Figure 1:
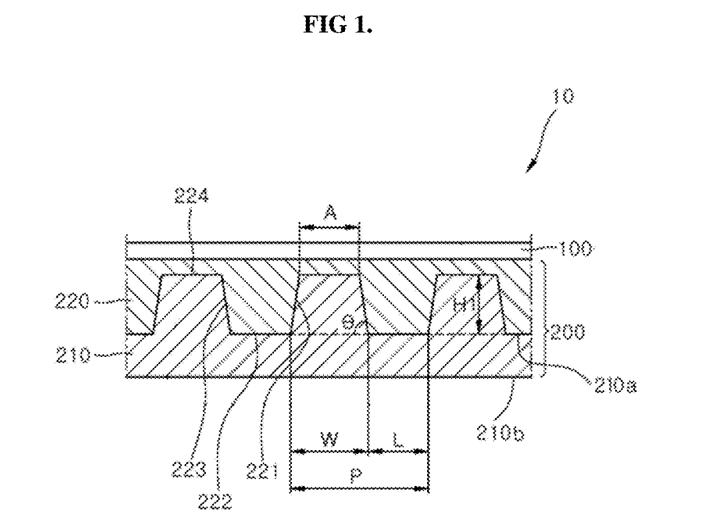
FIG. 1 is a cross-sectional view illustrating an optical film according to an example embodiment of the present disclosure.

Hereinafter, an optical film according to an example embodiment of the present disclosure will be described with reference to FIG. 1. FIG. 1 is a cross-sectional view illustrating the optical film according to an example embodiment of the present disclosure.

Referring to FIG. 1, in an optical film 10, a contrast ratio improvement layer 200 is formed on a lower surface of a protective layer 100.

Protective Layer

The protective layer 100 may be formed on one surface of the contrast ratio improvement layer 200 to support the contrast ratio improvement layer 200. The protective layer 100 may be directly formed on a second resin layer 220 of the contrast ratio improvement layer 200 to reduce a thickness of the optical film 10. The expression "directly formed on" indicates that no intervening layers (such as an adhesive layer, a bonding layer, or an adhesive bonding layer) are interposed between the protective layer 100 and the contrast ratio improvement layer 200.

The contrast ratio improvement layer 200 may be formed on a light incidence surface of the protective layer 100. Light passing through the contrast ratio improvement layer 200 may be further emitted (transmitted) through the protective layer 100.

The protective layer 100 may have a total visible light transmittance of about 90% or more, for example, about 90% to about 100%. Within these ranges, the protective layer 100 may transmit incident light without affecting (e.g., the intensity of) the incident light.

The protective layer 100 may be a protective film or a protective coating layer that has a light incidence surface and a light exit surface opposite to the light incidence surface. For example, a degree of support for the contrast ratio improvement layer 200 may be increased by using the protective film as the protective layer 100.

When the protective layer 100 is the protective film, the protective layer 100 may include a single layer of an optically transparent resin film. However, in some embodiments, the protective layer 100 may include a plurality of stacked resin films. The protective film may be formed by melting and extruding a resin. In some embodiments, an elongation process may be further added. The resin may include at least one selected from a cellulose ester-based resin (including triacetyl cellulose (TAC) and/or the like), a cyclic polyolefin-based resin (including amorphous cyclic polyolefin (COP)), a polycarbonate-based resin, a polyester-based resin (including a polyethylene terephthalate (PET) and/or the like), a polyether sulfone-based resin, a polysulfone-based resin, a polyamide-based resin, a polyimide-based resin, a non-cyclic-polyolefin-based resin, a polyacrylate-based resin (including a polymethylmethacrylate resin and/or the like), a polyvinyl alcohol-based resin, a polyvinyl chloride-based resin, and a polyvinylidene chloride-based resin.

The protective film may be a non-elongated film. However, the protective film may be a retardation film or an isotropic optical film, which may exhibit retardation properties when the resin forming the film is elongated according to a particular method. In some embodiments, the protective film may be an isotropic optical film having a Re of about 0 nm to about 60 nm, for example, about 40 nm to about 60 nm. Within these ranges, a high image quality may be attained by compensating for a viewing angle. Herein, the term "isotropic optical film" refers to a film in which nx, ny, and nz are substantially the same (wherein nz represents a refractive index in a direction orthogonal to the refractive indices nx and ny). Herein, the expression "substantially the same" includes not only a case in which nx, ny, and nz are completely the same, but also a case in which there is an acceptable or suitable margin of error between nx, ny, and nz. In some embodiments, the protective film may be a retardation film having a Re of about 60 nm or more. For example, the protective film may have a Re of about 60 nm to about 500 nm, for example, about 60 nm to about 300 nm. In some embodiments, the protective film may have a Re of about 8,000 nm or more, for example about 10,000 nm or more, about 10,100 nm to about 30,000 nm, or about 10,100 nm to about 15,000 nm. Within these ranges, it is possible to prevent or reduce a rainbow spot from being visible and further improve light diffusion through the contrast ratio improvement layer 200.

The protective coating layer may be made of an ultraviolet (UV) curable resin composition including a UV curable compound and an initiator. The UV curable compound may include at least one selected from a cation polymerizable curable compound, a radical polymerizable curable compound, a urethane resin, and a silicone-based resin. The cation polymerizable curable compound may include at least one selected from an epoxy-based compound having at least one epoxy group in a molecule thereof and an oxetane-based compound having at least one oxetane ring in a molecule thereof. The epoxy-based compound may include at least one selected from a hydrogenated epoxy-based compound, a chain aliphatic epoxy-based compound, a cyclic aliphatic epoxy-based compound, and an aromatic epoxy-based compound.

The radical polymerizable curable compound may be obtained by reacting a (meth)acrylate monomer having at least one (meth)acryloyloxy group in a molecule thereof with two or more types or kinds of functional group-containing compounds, and may include a (meth)acrylate oligomer having at least two (meth)acryloyloxy groups in a molecule thereof. Non-limiting examples of the (meth)acrylate monomer may include a monofunctional (meth)acrylate monomer having a single (meth)acryloyloxy group in a molecule thereof, a bifunctional (meth)acrylate monomer having two (meth)acryloyloxy groups in a molecule thereof, and a polyfunctional (meth)acrylate monomer having three or more (meth)acryloyloxy groups in a molecule thereof. The (meth)acrylate oligomer may include at least one selected from a urethane (meth)acrylate oligomer, a polyester (meth)acrylate oligomer, an epoxy (meth)acrylate oligomer, and/or the like. The initiator may cure the UV curable compound. The initiator may include a photo-cationic initiator and/or a photosensitizer. Any suitable initiator available in the art may be used as the photo-cationic initiator and the photosensitizer.

A thickness of the protective layer 100 may be about 5 μm to about 200 μm, for example, about 30 μm to about 120 μm. When the protective layer 100 is provided as a protective film, a thickness of the protective film may be about 30 μm to about 100 μm, for example, about 50 μm to about 90 μm. When the protective layer 100 is provided as a protective coating layer, a thickness of the protective coating layer may be about 5 μm to about 50 μm. Within these ranges, the protective layer 100 may be used in a polarizing plate.

A surface treatment layer (such as a primer layer, a hard coating layer, a fingerprint-resistant layer, an anti-reflection layer, an anti-glare layer, a low reflection layer, and/or an ultra-low reflection layer) may be further formed on at least one surface (e.g., an upper surface and/or a lower surface) of the protective layer 100. The hard coating layer, the fingerprint-resistant layer, the anti-reflection layer, and/or the like may provide an additional function to the protective layer 100, a polarizing film and/or the like. The primer layer may improve adhesion between the protective layer 100 and an adherend (for example, a polarizer).

Contrast Ratio Improvement Layer

The contrast ratio improvement layer 200 includes a first resin layer 210 and a second resin layer 220 facing the first resin layer 210. For example, the contrast ratio improvement layer 200 may include the first resin layer 210 and the second resin layer 220, where the first resin layer 210 and the second resin layer 220 are in direct contact with each other.

The first resin layer 210 is formed on a light incidence surface of the second resin layer 220. Light incident from a lower surface of the first resin layer 210 may be emitted (e.g., transmitted) to the second resin layer 220. The first resin layer 210 may diffuse light by refracting and emitting the light incident from the lower surface thereof in one or more directions according to the incident position of the light.

The first resin layer 210 may be directly formed on the second resin layer 220. A patterned portion is formed on an interface between the first resin layer 210 and the second resin layer 220 (e.g., where a lower surface of the second resin layer 220 is in direct contact with the first resin layer 210). FIG. 1 illustrates an embodiment in which the patterned portion is in complete contact with the second resin layer 220. However, in some embodiments, the patterned portion is in contact with at least or only a portion of the second resin layer 220. A non-contacting portion between the second resin layer 220 and the first resin layer 210 may be filled with air or a resin having a particular refractive index. In some embodiments, the patterned portion may be in complete contact with the second resin layer 220.

The patterned portion has at least two embossed optical patterns 221 and a flat section 222 between immediately adjacent embossed optical patterns 221. The patterned portion is configured so that a combination of the embossed optical pattern 221 and the flat section 222 is repeatedly formed.

The embossed optical pattern 221 may have a first surface 224 formed at a top portion thereof and at least one inclined surface 223 connected to the first surface 224. The first resin layer 210 has an upper surface 210a and a lower surface 210b. The upper surface 210a of the first resin layer 210 may be at an interface between the first resin layer 210 and the second resin layer 220, and may correspond to (e.g., be positioned in) the patterned portion.

The patterned portion may satisfy Expression 1, and the embossed optical pattern 221 may have a base angle (θ) of about 75° to about 90°. The term "base angle (θ)" refers to an angle between the inclined surface 223 of the embossed optical pattern 221 and a line corresponding to a maximum width W of the embossed optical pattern 221, the base angle being about 75° to about 90°. Here, the inclined surface 223 refers to the inclined surface that is directly connected to the flat section 222 of the embossed optical pattern 221. Within these ranges, it is possible to improve a side contrast ratio and a contrast ratio at the same side surfaces viewing angle. For example, the base angle (θ) may be about 75°, 76°, 77°, 78°, 79°, 80°, 81°, 82°, 83°, 84°, 85°, 86°, 87°, 88°, 89°, or 90°, for example, about 80° to about 90°. P/W (a ratio of P to W) may be about 1.1, 1.2, 1.3, 1.4, 1.5, 1.6, 1.7, 1.8, 1.9, 2, 2.5, 3.0, 3.5, 4.0, 4.5, 5.0, 5.5, 6.0, 6.5, 7.0, 7.5, 8.0, 8.5, 9.0, 9.5, or 10, for example, about 1.2 to about 8.

$$1 < P/W \leq 10. \qquad \text{Expression 1}$$

In Expression 1,

P is a pitch (unit: μm) of the patterned portion, and

W is the maximum width (unit: μm) of the embossed optical pattern.

FIG. 1 illustrates a case in which both base angles (θ) of the embossed optical pattern are (simultaneously) the same. However, when the base angle (θ) is about 75° to about 90°, an embossed optical pattern having different base angles (θ) may also be included in the scope of the present disclosure.

The embossed optical pattern 221 may be an optical pattern that has the first surface 224 formed at the top portion thereof and at least one inclined surface 223 connected to the first surface 224. FIG. 1 illustrates that the embossed optical pattern 221 is a trapezoidal optical pattern in which two adjacent inclined surfaces 223 are connected by the first surface 224, but embodiments of the present disclosure are not limited thereto. The embossed optical pattern 221 may be an optical pattern having a rectangular cross section and/or a square cross section, in addition to or instead of a trapezoidal cross section. In some embodiments, for example, the embossed optical pattern may have a trapezoidal, rectangular, and/or square cross-sectional shape.

Since the first surface 224 is formed at the top portion, light reaching the second resin layer 220 may be further diffused by the first surface 224 in an optical display device, thereby improving a viewing angle and brightness. Therefore, an optical diffusion effect may be improved to minimize or reduce brightness loss. The first surface 224 may be a flat surface and may also facilitate a manufacturing process of the optical film 10. However, in some embodiments, the first surface 224 may have a fine concave-convex surface or a curved surface. When the first surface 224 is a curved surface, a lenticular lens pattern may be formed. FIG. 1 illustrates a pattern in which a plane is formed at a top portion (first surface) thereof, an inclined surface thereof is a plane, and a cross section thereof has a trapezoidal shape (for example, a prism pattern having a truncated triangular cross-section, or a cut-prism shape). However, in some embodiments, an embossed optical pattern may have a shape in which a first surface is formed at a top portion and an inclined surface is a curved surface (for example, a contrast ratio improvement layer having a cut-lenticular lens pattern such as a truncated lenticular lens pattern, or a cut-micro lens pattern such as a truncated micro-lens pattern). In some embodiments, a pattern may have a cross section in the form of an N-sided shape (such as a rectangular shape or a square shape), wherein N is an integer from 3 to 20.

The first surface 224 may be formed parallel to at least one selected from the flat section 222, a bottom surface of the first resin layer 210, and a top surface of the second resin layer 220 (e.g., an upper surface of the second resin layer 220). FIG. 1 illustrates a case in which the first surface 224 of the embossed optical pattern 221, the flat section 222 thereof, the bottom surface of the first resin layer 210, and the top surface of the second resin layer 220 are parallel to one another.

A width A of the first surface 224 may be about 0.5 μm to about 30 μm, for example, about 1 μm to about 15 μm. Within these ranges, the embossed optical pattern 221 may be used in an optical display device, and a contrast ratio improvement effect may be observed.

An aspect ratio (H1/W) of the embossed optical pattern 221 may be about 0.1 to about 10, for example, about 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, or 10, about 0.1 to about 7.0, about 0.1 to about 5.0, or about 0.1 to about 1.0. Within these ranges, it is possible to improve a contrast ratio and a viewing angle at the side surfaces of an optical display device.

A maximum height H1 of the embossed optical pattern 221 may be greater than about 0 μm and equal to or less than about 20 μm, for example, greater than about 0 μm and equal to or less than about 15 μm, or greater than about 0 μm and equal to or less than about 10 μm. Within these ranges, it is possible to improve a contrast ratio, a viewing angle, and brightness, and to prevent or reduce a Moiré phenomenon from occurring.

The maximum width W of the embossed optical pattern 221 may be greater than about 0 μm and equal to or less than about 20 μm, for example, greater than about 0 μm and equal to or less than about 15 μm, or greater than about 0 μm and equal to or less than about 10 μm. Within these ranges, it is possible to improve a contrast ratio, a viewing angle, and brightness, and to prevent or reduce a Moiré phenomenon from occurring.

FIG. 1 illustrates the patterned portion in which embossed optical patterns are formed to have the same base angle, a first surface with the same width, the same maximum height, and the same maximum width. However, adjacent embossed optical patterns may have different base angles, first surfaces with different widths, different maximum heights, and different maximum widths.

The flat section 222 may emit (e.g., transmit) light passing through the first resin layer 210 to the second resin layer 220, thereby improving brightness at a front side of an optical display device.

A ratio (W/L) of the maximum width W of the embossed optical pattern 221 to a width L of the flat section 222 may be greater than about 0 and equal to or less than about 9, for example, about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0, about 0.1 to about 3, or about 0.15 to about 2. Within these ranges, it is possible to reduce a difference between the front contrast ratio and the side contrast ratio, and to improve a contrast ratio at the same side viewing angle and at the same front viewing angle. In addition, a Moiré phenomenon may be prevented or reduced. The width L of the flat section 222 may be about 1 μm to about 50 μm, for example, about 1 μm to about 20 μm. Within these ranges, it is possible to improve brightness at a front side of an optical display device.

The maximum width W of one embossed optical pattern 221 and the flat section 222 immediately adjacent to the embossed optical pattern 221 form one pitch P. The pitch P may be about 1 μm to about 50 μm, for example, about 1 μm to about 40 μm. Within these ranges, it is possible to improve a contrast ratio and to prevent or reduce a Moiré phenomenon.

FIG. 1 illustrates an embodiment in which adjacent patterned portions have the same pitch and the same maximum width. However, in some embodiments, adjacent patterned portions may have different pitches and different maximum widths.

A refractive index of the first resin layer 210 may be greater than about 0 and less than about 1.52, for example, greater than or equal to about 1.35 and less than about 1.50. Within these ranges, it is possible to improve a light diffusion effect, facilitate manufacturing of an optical display device, and significantly improve polarized light diffusion and a contrast ratio.

The first resin layer 210 may be made of a composition for a first resin layer, which includes a curable resin. The composition for the first resin layer may further include an initiator. The curable resin and the initiator may be the same as those used in a composition for a second resin layer. The composition for the first resin layer may further include an additive of the composition as used in the second resin layer.

In some embodiments, the first resin layer 210 may be a non-adhesive layer having no adhesion. When the first resin layer 210 is a non-adhesive layer, the optical film 10 may be stacked on an adherend (for example, a polarizing film) through an adhesive, a bonding agent, and/or an adhesive bonding agent.

In some embodiments, the first resin layer 210 may have an adhesive property (e.g., be adhesive, or be an adhesive layer). When the first resin layer 210 has the adhesive property, the optical film 10 may be stacked on an adherend without an additional adhesive, bonding agent, or adhesive bonding agent, thereby reducing a thickness of the optical film 10.

In some embodiments, the first resin layer 210 may not include a metal complex dye and/or an organic black dye.

FIG. 1 illustrates that the embossed optical pattern 221 is formed to elongate in a stripe shape in a lengthwise direction. However, in some embodiments, the embossed optical pattern 221 may be formed in a dot shape. The term "dot" refers to that the embossed optical patterns 221 are spaced apart from each other and are dispersed. In some embodiments, for example, the embossed optical pattern 221 may be formed to elongate in the stripe shape such that a viewing angle from a left or a right is widened.

The second resin layer 220 has a refractive index greater than that of the first resin layer 210. Therefore, the contrast ratio improvement layer 200 may improve a side contrast ratio by diffusing and emitting light incident from a light incidence surface of the first resin layer 210. Although the contrast ratio on the side surfaces is improved, it is possible to minimize or reduce a reduction in a contrast ratio on the front surface, reduce a difference between the contrast ratio on the front surface and the contrast ratio on the side surfaces, and improve a contrast ratio at the same side viewing angle and at the same front viewing angle. A refractive index difference between the second resin layer 220 and the first resin layer 210 may be greater than or equal to about 0.05, for example, about 0.05, 0.1, 0.15, 0.2, 0.25, or 0.3, for example, about 0.05 to about 0.3, and more for example, about 0.05 to about 0.2. Within these ranges, it is possible to significantly improve concentrated light diffusion and a contrast ratio.

The refractive index of the second resin layer 220 may be greater than or equal to about 1.50, for example, about 1.50, 1.55, 1.60, 1.65, or 1.70, or about 1.55 to about 1.70. Within these ranges, it is possible to improve a light diffusion effect.

The second resin layer 220 may include a metal complex dye and/or an organic black dye, and a composition for a second resin layer may include a curable resin.

After the metal complex dye and/or the organic black dye is dispersed (e.g., in the second resin layer 220), an average particle diameter (D50) thereof may be greater than about 0 nm and equal to or less than about 100 nm, for example, about 5 nm, 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, 95 nm, or 100 nm, about 1 nm to about 100 nm, or about 5 nm to about 80 nm. Within these ranges, it is possible to obtain the effects of the present disclosure.

The average particle diameter of the metal complex dye and the organic and/or black dye may be significantly smaller than each of the maximum width W of the embossed optical pattern 221 and the width L of the flat section 222. For example, a ratio of the average particle diameter of the metal complex dye and/or the organic black dye to the maximum width W of the embossed optical pattern 221, the width L of the flat section 222, and/or the width A of the first surface 224 of the embossed optical pattern 221 (e.g., the average particle diameter of the metal complex dye and/or organic black dye: the maximum width W of the embossed optical pattern 221, the width L of the flat section 222, and/or the width A of the first surface 224 of the embossed optical pattern 221) may be about 1:500 to about 1:800, for example, about 1:600 to about 1:800. Within these ranges, it is possible to obtain the effects of the present disclosure.

The second resin layer 220 may include the metal complex dye and/or the organic black dye having the above average particle diameter, thereby improving the front contrast ratio, lowering the reflectance, and lowering the degree of a color shift on the side surfaces. Within these average particle diameter ranges, when the metal complex dye and/or the organic black dye is between adjacent embossed optical patterns 221, emission (or transmission) of light from the flat section 222 of the first resin layer 220 is not affected, thereby improving a front contrast ratio, and light emitted to a side surface of a pattern is not affected, thereby also improving the side contrast ratio due to the patterned portion. The second resin layer 220 may include the metal complex dye and/or the organic black dye, thereby improving a side contrast ratio and lowering the reflectance despite a layer increase. It is possible to increase low black visibility caused by side light leakage of an LCD panel. Panel reflectance measured at the protective layer 100 with respect to the optical film 10 may be less than about 5%, for example, about 0% to about 4.95%, or about 0% to about 4.9%. Within these ranges, reflectance may be lowered to improve an external appearance.

In some embodiments, the metal complex dye and/or the organic black dye may be included in an amount of about 0.01 wt % to about 10 wt %, for example, in an amount of about 0.01 wt %, 1 wt %, 2 wt %, 3 wt %, 4 wt %, 5 wt %, 6 wt %, 7 wt %, 8 wt %, 9 wt %, or 10 wt %, in an amount of about 0.01 wt % to about 5.0 wt %, about 0.01 wt % to about 3.0 wt %, or about 0.01 wt % to about 2.0 wt %, in an amount of about 0.01 wt % to about 1.0 wt %, or in an amount of about 0.01 wt % to about 0.5 wt % with respect to a total weight of the second resin layer 220. Within these ranges, it is possible to improve the front contrast ratio, lower the reflectance, increase black visibility, and add the metal complex dye and/or the organic black dye to the second resin layer 220. In addition, it is possible to obtain an excellent dye dispersion and prevent or decrease a reduction in light transmittance of the second resin layer 220.

The light transmittance of the second resin layer 220 may be about 50% to about 92%, for example, about 75% to about 85% at a wavelength of 550 nm. Within these ranges, it is possible to (e.g., simultaneously) improve both the side contrast ratio due to a pattern and a front contrast ratio.

Figure 2:
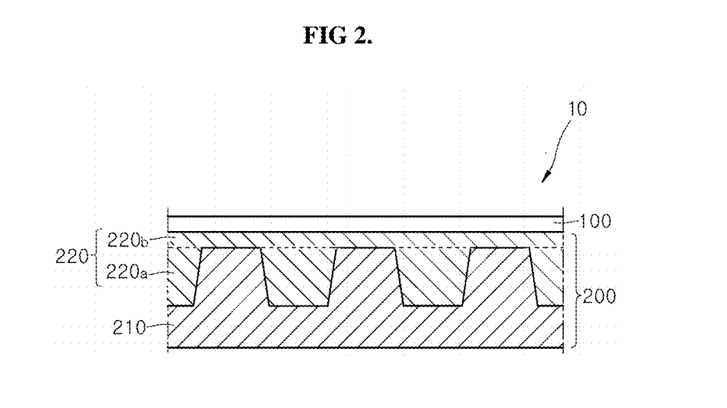
FIG. 2 illustrates a first zone and a second zone of a second resin layer in the optical film of the present disclosure.

In some embodiments, the metal complex dye and/or the organic black dye may be included in an entirety of (e.g., throughout) the second resin layer 220. For example, when a space between immediately adjacent embossed optical patterns 220 (e.g., a corresponding one of the embossed optical patterns and an immediately adjacent embossed optical pattern) is defined as a "first zone" and a space between a virtual surface connecting the first surfaces 224 of the spaced apart embossed optical patterns 220 and the lower surface of the protective layer 100 is defined as a "second zone" in the second resin layer 220, the second resin layer 220 may include the first zone and the second zone, the first zone and the second zone may be in contact with each other, and the metal complex dye and/or the organic black dye may be (e.g., simultaneously) included in both of the first zone and the second zone. As such, the second resin layer 220 may be easily manufactured. FIG. 2 illustrates a first zone 220a and a second zone 220b of the second resin layer 220 in the described-above optical film 10. However, in some embodiments, the metal complex dye and/or the organic black dye may be included in the first zone and not included in the second zone.

Hereinafter, a metal complex dye will be described in more detail.

The metal complex dye may include a metal-containing black dye.

The metal complex dye may include a 1:1 metal complex dye and/or a 1:2 metal complex dye. The term "1:1 metal complex dye" refers to a dye in which one metal atom is combined with one dye molecule. The term "1:2 metal complex dye" refers to a dye in which one metal atom is combined with two dye molecules.

The metal may be or include chromium (Cr), nickel (Ni), cobalt (Co), or copper (Cu), but embodiments of the present disclosure are not limited thereto.

The dye molecule may include an azo-based molecule (for example, a monoazo-based molecule) including at least one selected from a hydroxyl group, a carboxyl group, and an amino group. Therefore, it is possible to further improve a side contrast ratio due to an optical pattern as well as a front contrast ratio due to the metal complex dye, and also further lower the reflectance and further increase black visibility.

In some embodiments, the metal complex dye may be a metal-containing azo-based dye and may have a $C_6$-$C_{20}$ monocyclic or multicyclic aromatic functional group. For example, the metal complex dye may include a $C_8$-$C_{15}$ monocyclic or multicyclic aromatic functional group (such as a phenyl group and/or a naphthalene group) as a monocyclic or multicyclic aromatic functional group. As a result, when the metal complex dye is mixed with a UV curable resin forming the second resin layer 220, the UV curable resin may be well cured, thereby increasing hardness of the second resin layer 220 and preventing or reducing separation of the metal complex dye from the second resin layer 220.

In some embodiments, the metal complex dye may include a type or kind of a dye, such as a red metal complex dye, a green metal complex dye, and/or a blue metal complex dye.

In some embodiments, the metal complex dye may include a mixture of a red metal complex dye, a green metal complex dye, and a blue metal complex dye.

A refractive index of the metal complex dye may be about 1.6 to about 2.2, for example, about 1.6, 1.7, 1.8, 1.9, 2.0, 2.1, or 2.2, or about 1.9 to about 2.1. Within these ranges, when the metal complex dye is included in the second resin layer 220, a refractive index of the second resin layer 220 may not be lowered.

The metal complex dye is not particularly limited, but commercially sold products may be used as the metal complex dye. For example, at least one selected from Orasol® Black X55 (BASF Company, Ludwigshafen, Germany) and Orasol® Black X51 (BASF Company) may be used as the metal complex dye.

Hereinafter, an organic black dye will be described in more detail.

The organic black dye may be a nonmetallic-based dye not including a metal, and may include a black dye including only organic molecules.

The organic black dye has high dispersibility (minimum dispersion unit of 1 nm to 5 nm), high transparency, and high brightness. In contrast, an inorganic black dye including carbon black and/or the like has poor dispersibility (minimum dispersion unit of 50 nm to 400 nm) and is opaque. Since the dispersion size of several nm in the organic black dye is suitable for a micro pattern size and a solvent-free imprinting process, and because of its high dispersibility, reduction in brightness, and high transmittance, the organic black dye may be selected instead of an inorganic black dye (e.g., carbon black).

A refractive index of the organic black dye may be about 1.6 to about 2.2, for example, about 1.6, 1.7, 1.8, 1.9, 2.0, 2.1, or 2.2, or about 1.9 to about 2.1. Within these ranges, when the organic black dye is included in the second resin layer 220, a refractive index of the second resin layer 220 may not be lowered.

In some embodiments, the organic black dye may be a trichromatic dye mixture. For example, the trichromatic dye mixture may be a mixture of a first dye (orange color dye), a second dye (red color dye), and a third dye (blue color dye). The first dye, the second dye, and the third dye may have different maximum absorption wavelengths. The "maximum absorption wavelength" is measured at a concentration of 5 mg/L (5 wt %) of each of the first to third dyes in a solvent, such as methyl ethyl ketone. The concentration range may be any concentration appropriate or suitable for measuring transmittance.

The first dye may include a dye having a maximum absorption wavelength of about 430 nm to about 450 nm, for example, about 440 nm. The absorption wavelength range may be about 360 nm to about 640 nm.

The second dye may include a dye having a maximum absorption wavelength of about 510 nm to about 530 nm, for example, about 520 nm. The absorption wavelength range may be about 360 nm to about 740 nm.

The third dye may include a dye having a maximum absorption wavelength of about 590 nm to about 610 nm, for example, about 600 nm. The absorption wavelength range may be about 360 nm to about 740 nm.

In some embodiments, the organic black dye may be a mixture in which the first dye is included in an amount of about 30 wt % to about 50 wt %, for example, about 30 wt %, 35 wt %, 40 wt %, 45 wt %, or 50 wt %, or in an amount of about 40 wt % to about 50 wt % with respect to the total weight of the organic black dye. The second dye is included in an amount of about 1 wt % to about 20 wt %, for example, in an amount of about 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, or 20 wt %, or in an amount of about 1 wt % to about 10 wt % with respect to the total weight of the organic black dye. The third dye is included in an amount of about 30 wt % to about 50 wt %, for example, in an amount of about 30 wt %, 35 wt %, 40 wt %, 45 wt %, or 50 wt %, or in an amount of about 40 wt % to about 50 wt % with respect to the total weight of the organic black dye. Within these ranges, it is possible to obtain a black dye having high brightness.

The first dye (orange color dye) may be or include an azo-based dye, for example, an aromatic azo-based dye. For example, a dye represented by Formula 1 (for example, Synolon yellow Brown K-2RS, Kyung in Synthetic Corporation, Incheon, Korea) may be used as the first dye, but embodiments of the present disclosure are not limited thereto:

Formula 1

The second dye (red color dye) may include an azo-based dye, for example, an aromatic azo-based dye. For example, a dye represented by Formula 2 (for example, Synolon rubine K-GFL, Kyung in Synthetic Corporation) may be used as the second dye, but embodiments of the present disclosure are not limited thereto:

Formula 2

The third dye (blue color dye) may include an azo-based dye, for example, an aromatic azo-based dye. For example, a dye represented by Formula 3 (for example, Synolon navy blue K-GLS, Kyung in Synthetic Corporation) may be used as the third dye, but embodiments of the present disclosure is not limited thereto:

Formula 3

The organic black dye is not particularly limited, and commercially sold products may be used as the organic black dye. For example, BS01 (Kyung in Synthetic Corporation), BS02 (Kyung in Synthetic Corporation), and/or the like may be used as the organic black dye.

A curable resin may include a UV curable resin and/or a thermosetting resin. The UV curable resin may be used to form the second resin layer 220 in a short time, and so that a pattern shape is good or excellent when a pattern is formed. The curable resin may include a (meth)acrylic-based monomer, an oligomer, and/or a resin. As a resin having a high refractive index, the curable resin may include a resin having a repeating unit derived from a compound having a benzene ring structure as a main skeleton.

After the curable resin is cured, the refractive index thereof may be greater than or equal to about 1.55, for example, about 1.58 to about 1.62. Within these ranges, it is possible to secure the refractive index of the second resin layer 220.

The composition for the second resin layer may further include an initiator. The initiator may be for curing a curable resin, and may include a photo initiator and/or a thermal initiator. Any suitable initiator available in the art may be used as the photo initiator and/or the thermal initiator. The photoinitiator may include one selected from a phosphorus, triazine, acetophenone, benzophenone, thioxanthone, benzoin, oxime, phenyl ketone initiators, and mixtures thereof. The initiator may be included in an amount of about 0.01 wt % to about 5 wt %, for example, in an amount of greater than about 0.5 wt % and equal to or less than about 5 wt %, or in an amount of about 2 wt % to about 5 wt % based on a solid content of the second resin layer 220 or the composition for the second resin layer. Within these ranges, the composition for the second resin layer may be sufficiently cured, and the remaining amount of the initiator may prevent or reduce light transmission of the contrast ratio improvement layer 200 from being lowered.

To ensure composition coatability, the composition for the second resin layer may include solvents such as ethanol (EtOH), propylene glycol monomethyl ether acetate (PGME), methyl ethyl ketone (MEK), and methyl isobutyl ketone (MIBK), but embodiments of the present disclosure are not limited thereto.

The composition for the second resin layer may further include any suitable additive available in the art. The additive may include at least one selected from a leveling agent, a surface controlling agent, an antioxidant, a defoamer, an ultraviolet absorbent, and a photostabilizer.

A maximum thickness of the second resin layer 220 may be greater than about 0 μm and equal to or less than about 30 μm, for example, greater than about 0 μm and equal to or less than about 20 μm. Within these ranges, it is possible to prevent or reduce warpage (such as curling).

A difference (also called "wall thickness") between a maximum thickness of the second resin layer 220 and a maximum height of the embossed optical pattern 221 may be greater than about 0 μm and equal to or less than about 30 μm, for example, greater than about 0 μm and equal to or less than about 20 μm, or greater than about 0 μm and equal to or less than about 10 μm. Within these ranges, it is possible to minimize or decrease a reduction in the side contrast ratio.

In some embodiments, the second resin layer 220 may not include carbon black.

In some embodiments, the first resin layer 210 may not include carbon black.

A thickness of the contrast ratio improvement layer 200 may be about 10 μm to about 100 μm, for example, about 10 μm to about 50 μm, or about 10 μm to about 40 μm. Within these ranges, the contrast ratio improvement layer 200 may be used in an optical display device.

The contrast ratio improvement layer 200 may be prepared using any suitable method available in the art. For example, the contrast ratio improvement layer 200 may be formed by coating the protective layer 100 with the composition for the second resin layer, applying and curing the embossed optical pattern 221 and the flat section 222 to form the second resin layer 220, and applying and curing the composition for the first resin layer, but embodiments of the present disclosure are not limited thereto.

Hereinafter, an optical film according to another example embodiment of the present disclosure will be described.

The optical film according to the present example embodiment is the same as the optical film 10 according to the example embodiment of the present disclosure, except that a second resin layer does not include the metal complex dye or the organic black dye, and a first resin layer includes the metal complex dye and/or the organic black dye.

The metal complex dye and/or the organic black dye may be included in an amount of about 0.01 wt % to about 10 wt %, for example, in an amount of about 0.01 wt %, 1 wt %, 2 wt %, 3 wt %, 4 wt %, 5 wt %, 6 wt %, 7 wt %, 8 wt %, 9 wt %, or 10 wt %, in an amount of about 0.01 wt % to about 5.0 wt %, 0.01 wt % to 3.0 wt %, or 0.01 wt % to 2.0 wt %, or in an amount of about 0.01 wt % to about 1.0 wt % with respect to a total weight of the first resin layer. Within these ranges, it is possible to improve a front contrast ratio, increase black visibility, lower the reflectance, obtain high transmittance, and/or obtain excellent diffusion effect of a metal composite. The metal complex dye and the organic black dye may be the same as described above.

In some embodiments, the second resin layer may not include carbon black.

In some embodiments, the first resin layer may not include carbon black.

Hereinafter, an optical film for improving a contrast ratio according to another example embodiment of the present disclosure will be described.

In the optical film according to the present example embodiment, a second resin layer may include the metal complex dye and/or the organic black dye. The metal complex dye and/or the organic black dye may be included only in a first zone of the second resin layer but not included in second zone of the second resin layer. When the metal complex dye and/or the organic black dye is included in a specific zone (e.g., the first zone), it is possible to further improve a contrast ratio and brightness and prevent or decrease a reduction in light transmittance of the second resin layer.

The metal complex dye and/or the organic black dye may be included in an amount of about 0.01 wt % to about 10 wt %, for example, in an amount of about 0.01 wt %, 1 wt %, 2 wt %, 3 wt %, 4 wt %, 5 wt %, 6 wt %, 7 wt %, 8 wt %, 9 wt %, or 10 wt %, in an amount of about 0.1 wt % to about 5.0 wt %, about 0.01 wt % to about 3.0 wt %, or about 0.01 wt % to about 5 wt %, or in an amount of about 0.01 wt % to about 1.0 wt % with respect to a total weight of the second resin layer. Within these ranges, it is possible to improve the front contrast ratio, increase black visibility, lower the reflectance, obtain high transmittance, obtain excellent diffusion effect of a metal composite, and remove a refractive index difference between the first zone and the second zone. The metal complex dye and the organic black dye may each be the same as described above.

In some embodiments, an absolute value of the refractive index difference between the first zone and the second zone may be about 0.02 to about 0.20, for example, about 0.08 to about 0.20. Within these ranges, the refractive index difference between the first zone and the second zone may be reduced to prevent or decrease a reduction in light transmittance in each of the second resin layer, the optical film, and a polarizing plate.

In some embodiments, the second resin layer may not include carbon black.

In some embodiments, the first resin layer may not include carbon black.

Figure 3:
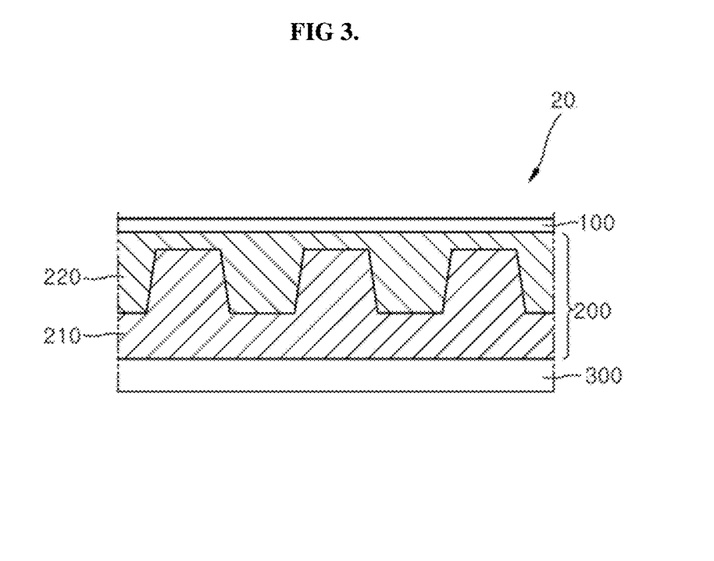
FIG. 3 is a cross-sectional view illustrating a polarizing plate according to an example embodiment of the present disclosure.

A polarizing plate according to an example embodiment of the present disclosure will be described with reference to FIG. 3. FIG. 3 is a cross-sectional view illustrating the polarizing plate according to an example embodiment of the present disclosure.

Referring to FIG. 3, a polarizing plate 20 may include a polarizing film 300 and an optical film. The optical film may be or include the optical film 10 according to an example embodiment of the present disclosure. The optical film may be on a light exit surface of the polarizing film 300. The optical film may diffuse polarized light passing through the polarizing film 300, thereby improving a front contrast ratio, a side contrast ratio, and a viewing angle, and increasing black visibility.

The polarizing film 300 may polarize light incident from a liquid crystal panel and transmit the polarized light to a contrast ratio improvement layer 200. The polarizing film 300 is formed on a light incidence surface of the contrast ratio improvement layer 200.

The polarizing film 300 may include a polarizer. For example, the polarizer may include a polyvinyl alcohol-based polarizer uniaxially elongating a polyvinyl alcohol-based film, or a polyene-based polarizer dehydrating the polyvinyl alcohol-based film. A thickness of the polarizer may be about 5 μm to about 40 μm. Within this range, the polarizer may be used in an optical display device.

The polarizing film 300 may include the polarizer and a protective layer formed on at least one surface of the polarizer. The protective layer may protect the polarizer, thereby improving reliability of the polarizing plate and increasing mechanical strength of the polarizing plate. The protective layer may include at least one selected from a protective film and a protective coating layer, both being optically transparent.

The protective layer may be the same as described above.

The polarizing plate may be formed using any suitable method. For example, the polarizing plate may be manufactured by preparing the optical film through the above-described method and attaching the polarizing film to another surface of the protective layer. The attaching may be performed using any suitable water-based adhesive and/or photocurable adhesive available in the art.

A liquid crystal display apparatus of the present disclosure may include the polarizing plate of the present disclosure. In some embodiments, the liquid crystal display apparatus may include the polarizing plate as a polarizing plate at a visible side with respect to a liquid crystal panel. The "polarizing plate at the visible side" may be positioned opposite to a screen, e.g., a light source, with respect to the liquid crystal panel.

In some embodiments, the liquid crystal display apparatus may include a backlight unit, a first polarizing plate, a liquid crystal panel, and a second polarizing plate, which are sequentially stacked. The second polarizing plate may include the polarizing plate of the present disclosure. The liquid crystal panel may use a vertical alignment (VA) mode, an in-plane switching (IPS) mode, a patterned vertical alignment (PVA) mode, or a super-patterned vertical alignment (S-PVA) mode, but embodiments of the present disclosure are not limited thereto. In some embodiments, the liquid crystal display apparatus may include the polarizing plate as a polarizing plate at a light source side with respect to the liquid crystal panel. The "polarizing plate at the light source side" is positioned at the light source side with respect to the liquid crystal panel. In some embodiments, both of the polarizing plate at the visible side and the polarizing plate at the light source side with respect to the liquid crystal panel may (e.g., simultaneously) include the polarizing plate of the present disclosure.

Hereinafter, the configuration and operation of the present disclosure will be described in more detail with reference to example embodiments of the present disclosure. However, it should be understood that the example embodiments are provided for illustration only, and are not to be in any way construed as limiting the present disclosure.

Example 1

0.15 parts by weight of a dye, i.e., Orasol® Black X55 (and a powdered 1:2 complex salt of Cr:an azo-based compound having an average particle diameter (D50) of 10 nm, BASF Company) was mixed into 100 parts by weight of a UV curable resin, i.e., SSC5760 (SHIN-A T&C, Seoul, Korea), and the resultant mixture was stirred at 2,000 rpm for 2 hours using a disperser to prepare a composition for a second resin layer.

100 parts by weight of an acrylic-based copolymer (i.e., adhesive PL8540) was mixed with 80 parts by weight of a diluting solvent (i.e., methyl ethyl ketone), and the resultant mixture was stirred at 500 rpm for 30 minutes using a stirrer to prepare a composition for a first resin layer.

The composition for the second resin layer was applied on one surface (light incidence surface) of a protective layer (i.e., a polyethylene terephthalate (PET) film (TA044, Toyobo Company, Osaka, Japan, a thickness of 80 μm)) to prepare a coating layer. An embossed optical pattern and a flat section were applied on the coating layer using a film in which the embossed optical pattern and the flat section were alternately formed and were UV-cured with a light amount of 500 mJ/cm$^2$ to form a second resin layer.

The prepared composition for the first resin layer was coated on one surface of the prepared second resin layer and was dried in an oven at a temperature of 90° C. for 4 minutes to form a first resin layer, thereby manufacturing an optical film for improving a contrast ratio. The first resin layer is adhesive and has a refractive index lower than that of the second resin layer. A dye is included in an entirety of the second resin layer ((e.g., simultaneously) in both of a first zone and a second zone) in the optical film.

Table 1 shows a specification of a patterned portion of a contrast ratio improvement layer.

One surface of the first resin layer of the optical film was laminated on a PET film surface of a polarizing film (AMN-6143CPS (CO) having a three-layered structure of PET/PVA/COP, Samsung SDI, Yong-in, Korea) to manufacture a polarizing plate.

Example 2

An optical film and a polarizing plate were manufactured in substantially the same manner as in Example 1, except that 0.3 parts by weight of Orasol® Black X55 was used in forming a composition for a second resin layer. The dye is included in an entirety of the second resin layer ((e.g., simultaneously) in both of a first zone and a second zone) in the optical film.

Example 3

An optical film and a polarizing plate were manufactured in substantially the same manner as in Example 1, except that 100 parts by weight of a resin, i.e., ECOKOT-H903 (NC Chem, Suwon, Korea) was used in place of the SSC5760, and 0.15 parts by weight of Orasol® Black X51 (a powdered 1:2 complex salt Cr:an azo-based compound having an average particle diameter (D50) of 10 nm, BASF Company) was used in place of Orasol® Black X55 in forming a composition for a second resin layer. The dye is included in an entirety of the second resin layer ((e.g., simultaneously) in both of a first zone and a second zone) in the optical film.

Example 4

An optical film and a polarizing plate were manufactured substantially in the same manner as in Example 1, except that 0.3 parts by weight of Orasol® Black X51 as a black dye was used in place of Orasol® Black X55 in forming a composition for a second resin layer. The dye is included in an entirety of the second resin layer ((e.g., simultaneously) in both of a first zone and a second zone) in the optical film.

Example 5

Figure 5:
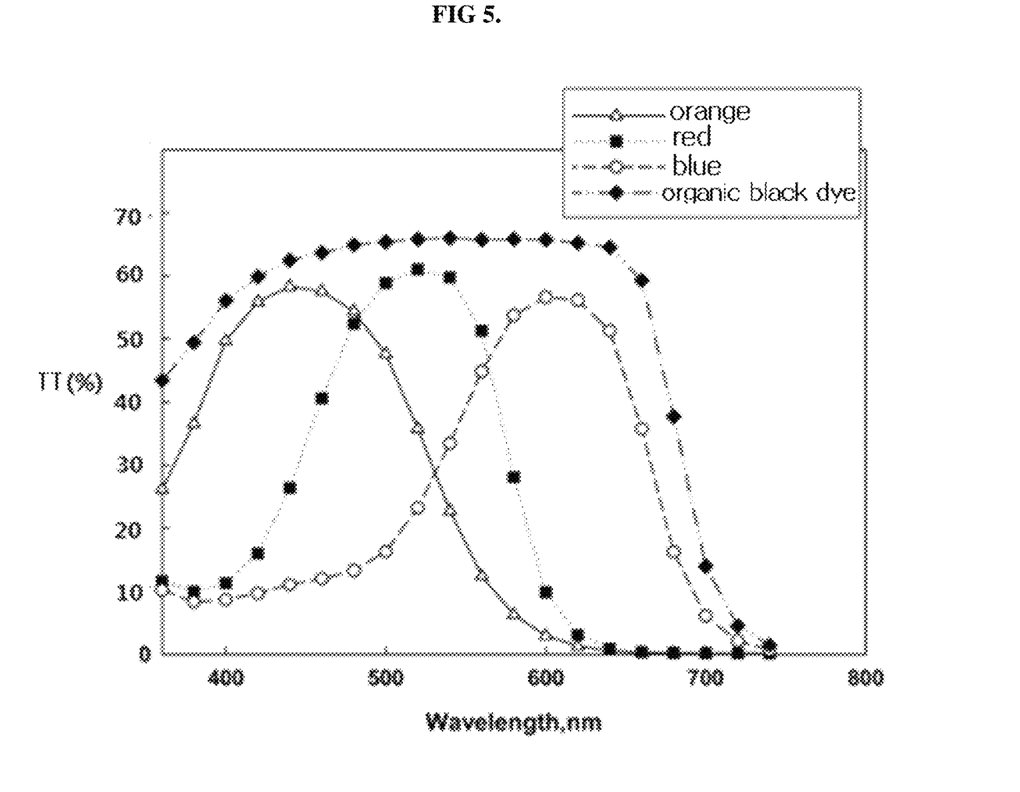
FIG. 5 is a plot of transmittance (TT) versus wavelength for a series of color dyes included in an organic black dye as used according to an example embodiment of the present disclosure.

An optical film and a polarizing plate were manufactured in substantially the same manner as in Example 1, except that 0.15 parts by weight of an organic black dye (an average particle diameter of 10 nm) was used in place of Orasol® Black X55 in forming a composition for a second resin layer. The organic black dye, which is a trichromatic dye mixture, was prepared by mixing 45 wt % of an orange color dye, i.e., Synolon yellow Brown K-2RS (Kyung in Synthetic Corporation), 10 wt % of a red color dye, i.e., Synolon rubine K-GFL (Kyung in Synthetic Corporation), and a blue color dye, i.e., 45 wt % of Synolon navy blue K-GLS (Kyung in Synthetic Corporation). FIG. 5 is a plot of transmittance versus wavelength for each color dye. The dye is included in an entirety of the second resin layer ((e.g., simultaneously) in both of a first zone and a second zone) in the optical film.

Example 6

A UV curable resin, i.e., SSC5760 (SHIN-A T&C) was used as a composition for a second resin layer.

100 parts by weight of an acrylic-based copolymer, i.e., adhesive resin PL8540 was mixed with 0.038 parts by weight of Orasol® Black X55 (having an average particle diameter of 10 nm, BASF Company) and 80 parts by weight of a diluting solvent, (i.e., methyl ethyl ketone), and the resultant mixture was stirred at 500 rpm for 30 minutes using a stirrer to prepare a composition for a first resin layer.

The prepared composition for the second resin layer was applied on one surface (light incidence surface) of a protective layer, i.e., a PET film (TA044 Toyobo Company, a thickness of 80 μm) to prepare a coating layer. An embossed optical pattern and a flat section were applied on the coating layer using a film in which the embossed optical pattern and the flat section were alternately formed, and were UV-cured with a light amount of 500 mJ/cm$^2$ to form a second resin layer.

The prepared composition for the first resin layer was coated on one surface of the prepared second resin layer and was dried in an oven at a temperature of 90° C. for 4 minutes to form a first resin layer, thereby manufacturing an optical film. The first resin layer is adhesive and has a refractive index lower than that of the second resin layer.

A polarizing plate was manufactured using the optical film in substantially the same manner as in Example 1.

Example 7

An optical film and a polarizing plate were manufactured in substantially the same manner as in Example 6, except that 0.076 parts by weight of Orasol® Black X55 was used in forming a composition for a first resin layer.

Example 8

100 parts by weight of an acrylic-based copolymer, i.e., adhesive resin PL8540, was mixed with 80 parts by weight of a diluting solvent, i.e., methyl ethyl ketone, and the resultant mixture was stirred at 500 rpm for 30 minutes using a stirrer to prepare a composition for a first resin layer.

100 parts by weight of a UV curable resin, i.e., SSC5760 (SHIN-A T&C) was used as a composition for a second zone of a second resin layer.

A certain amount of a dye, i.e., Orasol® Black X55 (a powdered 1:2 complex salt of Cr:an azo-based compound having an average particle diameter (D50) of 10 nm, BASF Company) was mixed into 100 parts by weight of a UV curable resin, i.e., SSC5760 (SHIN-A T&C), and the resultant mixture was stirred at 2,000 rpm for 2 hours using a disperser to prepare a composition for a first zone of the second resin layer.

The composition for the first resin layer was applied on a PET film surface (light exit surface) of a polarizing film (product name: AMN-6143CPS (CO) having a three-layered structure of PET/PVA/COP, Samsung SDI) to prepare a coating layer. An embossed optical pattern and a flat section were applied on the coating layer using a film in which the embossed optical pattern and the flat section were alternately formed, and were UV-cured with a light amount of 500 mJ/cm$^2$ to form a first resin layer.

The prepared composition for the first zone of the second resin layer was applied only between embossed optical patterns of the first resin layer. The prepared composition for the second zone of the second resin layer was applied on an applied layer. UV curing was performed with a light amount of 500 mJ/cm$^2$ to manufacture a polarizing plate.

Table 1 shows a specification of a patterned portion of a contrast ratio improvement layer. A dye was included only in the first zone and not in the second zone of the second resin layer. In forming the composition for the first zone of the second resin layer, Orasol® Black X55 was added to the second resin layer of the finally manufactured polarizing plate so as to have the contents shown in Table 2.

Example 9

A polarizing plate was manufactured in substantially the same manner as in Example 8, except that Orasol® Black X55 was added to a second resin layer so as to have the contents shown in Table 2.

Example 10

A polarizing plate was manufactured in substantially the same manner as in Example 8, except that Orasol® Black X51 was used instead of Orasol® Black X55 and was added to a second resin layer so as to have the contents shown in Table 2.

Comparative Example 1

A polarizing plate (product name: AMN-6143CPS (CO) having a structure of PET/PVA/COP, Samsung SDI) was used without an optical film for improving a contrast ratio.

Comparative Example 2

An optical film for improving a contrast ratio and a polarizing plate were manufactured in substantially the same manner as in Example 1, except that Orasol® Black X55 was not included in a second resin layer.

Comparative Example 3

An optical film and a polarizing plate were manufactured in substantially the same manner as in Example 1, except that 0.5 parts by weight of a light absorbent (xx-2740 Sekisui Company, Osaka, Japan, having an average diameter R (D50) of 6 μm) coated with a light absorption layer including carbon black with an acrylic-based light diffuser on a surface thereof was used in place of Orasol® Black X55 in forming a composition for a second resin layer.

Comparative Example 4

An optical film and a polarizing plate were manufactured in substantially the same manner as in Example 6, except that 0.5 parts by weight of a light absorbent (xx-2740 Sekisui Company, having an average diameter R (D50) of 6 μm) coated with a light absorption layer including carbon black with an acrylic-based light diffuser on a surface thereof was used in place of Orasol® Black X55 (used as a light absorbent) in forming a composition for a second resin layer.

TABLE 1

| Optical pattern shape | Maximum height H1 (μm) of embossed optical pattern | Maximum width (μm) of embossed optical pattern | Width A (μm) of first surface of embossed optical pattern | Base angle (°) of embossed optical pattern | Width L (μm) of flat section | Pitch P (μm) |
|---|---|---|---|---|---|---|
| Cut-prism (Trapezoidal, embossed pattern) | 5 | 8 | 6.7 | 86 | 7 | 15 |

Figure 4:
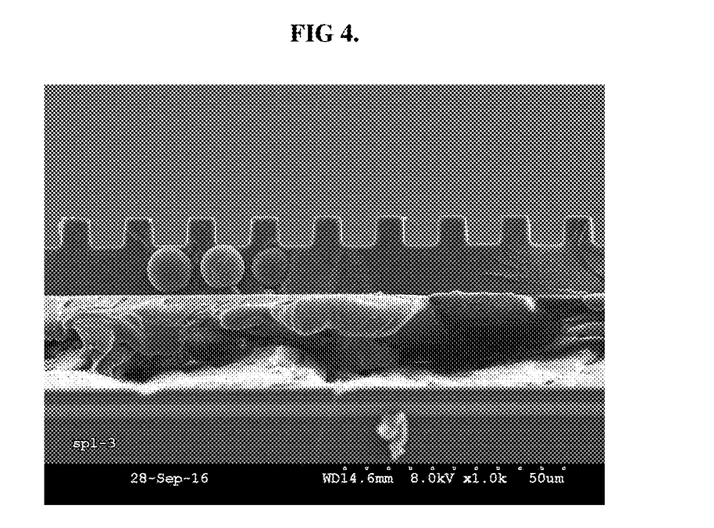
FIG. 4 is a scanning electron microscope (SEM) image of a cross section of an optical film according to Comparative Example 4.

The physical properties of each of the polarizing plates and optical films of the Examples and Comparative Examples were evaluated. Evaluation results are shown in Table 2, Table 3, and FIG. 4.

Panel Reflectance:

The optical films laminated on the polarizing film of the Examples and Comparative Examples were subsequently laminated on an SUHD 55-inch liquid crystal panel having an LCD VN type or kind Samsung Electronics using an adhesive having a refractive index of 1.46 to 1.50, and then, reflectance was measured in a wavelength range of 320 nm to 800 nm in an SCI reflection mode (D65 light source) using a reflectance meter, e.g., a spectrophotometer (CM-2600D Konica Minolta, Tokyo, Japan). A Y(D65) value was measured.

Manufacture of Polarizing Plate at Light Source Side

A polyvinyl alcohol film was elongated to three times its original length at a temperature of 60° C., allowed to adsorb iodine, and then elongated to 2.5 times the first elongated length in an aqueous boric acid solution having a temperature of 40° C. to thereby prepare a polarizer. A base layer, e.g., a triacetyl cellulose film (thickness of 80 μm) was bonded to both surfaces of the polarizer (e.g., simultaneously) using a polarizing plate adhesive (Z-200 Nippon Gohsei Company, Osaka, Japan) to manufacture a polarizing plate. The manufactured polarizing plate was used as a polarizing plate at a light source side.

Manufacture of Module for Liquid Crystal Display Apparatus

The manufactured polarizing plate at the light source side, liquid crystal panel (PVA mode) and each of the polarizing plates manufactured in the Examples and Comparative Examples were sequentially assembled to manufacture a module for a liquid crystal display apparatus. A protective layer was positioned at an outermost position of each of the polarizing plates manufactured in the Examples and Comparative Examples.

A light-emitting diode (LED) light source, a light guide plate, and the module for the liquid crystal display apparatus were assembled to manufacture a liquid crystal display apparatus including an edge type or kind LED light source (having substantially the same configuration as a Samsung TV (55 inches, model name: UN55KS8000F) except for the configuration of the modules for liquid crystal display apparatus in the Examples and Comparative Examples.

Front brightness was measured in each of a white mode and a black mode on a front surface (0°, 0°) and a side surface (0°, 80°) of a spherical coordinate system using EZ CONTRAST X88RC (EZXL-176R-F422A4 ELDIM Company, Hérouville-Saint-Clair, France).

A relative contrast ratio on the front surface was calculated as a ratio of a brightness of the white mode to a brightness value of the black mode in the spherical coordinate system (0°, 0°). A contrast ratio on the side surfaces was calculated as a ratio of a brightness of the white mode to a brightness value of the black mode in the spherical coordinate system (0°, 80°).

Front relative brightness in a front white mode was calculated as a ratio of brightness of a corresponding Example or Comparative Example to brightness of Comparative Example 1 in the white mode. Front relative brightness in the black mode was calculated as a ratio of brightness of a corresponding Example or Comparative Example to brightness of Comparative Example 1 in the white mode.

A skin (side) color shift was evaluated by using EZCONTRAST X88RC (EZXL-176R-F422A4, ELDIM Company). A low degree of shift indicates excellent properties.

An external appearance of the optical film was evaluated as being good or suitable when stripe patterns and unusual features were not visible in the external appearance. The external appearance was evaluated as being defective or unsuitable when stripe patterns or convex surfaces were generated.

Light transmittance of the polarizing plate was evaluated using V7100 Jasco Company (Hachioji, Japan).

TABLE 2

| | | Examples | | | | | | | | | |
|---|---|---|---|---|---|---|---|---|---|---|---|
| | | 1 | 2 | 3 | 4 | 5 | 6 | 7 | 8 | 9 | 10 |
| First resin layer (low refractive index layer) | Refractive index | 1.481 | 1.481 | 1.481 | 1.481 | 1.481 | 1.481 | 1.481 | 1.481 | 1.481 | 1.481 |
| | X55 content (wt %) | 0 | 0 | 0 | 0 | 0 | 0.038 | 0.076 | 0 | 0 | 0 |
| Second resin layer (high refractive index layer) | Refractive index | 1.572 | 1.572 | 1.585 | 1.572 | 1.572 | 1.572 | 1.572 | 1.572 | 1.572 | 1.572 |
| | X55 content (wt %) | 0.15 | 0.3 | 0 | 0 | 0 | 0 | 0 | 0.15 | 0.30 | 0 |
| | X51 content (wt %) | 0 | 0 | 0.15 | 0.3 | 0 | 0 | 0 | 0 | 0 | 0.15 |
| | Organic black dye (wt %) | 0 | 0 | 0 | 0 | 0.15 | 0 | 0 | 0 | 0 | 0 |
| | Dye position | First zone + Second zone | First zone + Second zone | First zone + Second zone | First zone + Second zone | First zone + Second zone | First resin layer | First resin layer | First zone | First zone | First zone |
| Front relative brightness (%) | White mode | 92 | 87 | 91 | 92 | 92 | 92 | 88 | 94 | 89 | 95 |
| | Black mode | 124 | 118 | 123 | 123 | 125 | 126 | 119 | 125 | 119 | 126 |
| Contrast ratio (wt %) | (0°, 0°) | 74.2 | 73.7 | 74.0 | 74.8 | 73.6 | 73 | 73.9 | 75.2 | 74.8 | 75.4 |
| | (0°, 80°) | 141 | 142 | 141 | 141 | 141 | 141 | 142 | 142 | 141 | 141 |
| Panel reflectance (%) | | 4.82 | 4.62 | 4.81 | 4.83 | 4.60 | 4.80 | 4.59 | 4.91 | 4.81 | 4.92 |
| Skin color shift ($\Delta xy@45°$) | Left and right | 0.010 | 0.010 | 0.010 | 0.011 | 0.010 | 0.010 | 0.011 | 0.010 | 0.011 | 0.011 |
| | Up and down | 0.009 | 0.008 | 0.009 | 0.009 | 0.009 | 0.008 | 0.009 | 0.009 | 0.008 | 0.008 |

TABLE 2-continued

|  | Examples | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| External appearance | Good | Good | Good | Good | Good | Good | Good | Good | Good | Good |
| Light transmittance (%) | 39.227 | 36.437 | 39.192 | 36.332 | 39.437 | 39.335 | 36.214 | 41.122 | 38.567 | 41.254 |

TABLE 3

|  |  | Comparative Example | | | |
| --- | --- | --- | --- | --- | --- |
|  |  | 1 | 2 | 3 | 4 |
| First resin (low refractive index layer) | Refractive index | — | 1.481 | 1.481 | 1.481 |
|  | Carbon black (wt %) | — | 0 | 0 | 0.5 |
| Second resin (high refractive index layer) | Refractive index | — | 1.5729 | 1.572 | 1.572 |
|  | Carbon black content (wt %) | — | 0 | 0.5 | 0 |
| Front relative brightness (%) | White mode | 100 | 95 | 91 | 92 |
|  | Black mode | 100 | 136 | 130 | 132 |
| Contrast ratio (%) | (0°, 0°) | 100 | 69.9 | 70.0 | 69.7 |
|  | (0°, 80°) | 100 | 140 | 141 | 140 |
| Panel reflectance (%) |  | 4.95 | 5.18 | 5.11 | 5.12 |
| Skin color shift ($\Delta xy@45°$) | Left and right | 0.0161 | 0.010 | 0.010 | 0.011 |
|  | Up and down | 0.009 | 0.009 | 0.008 | 0.009 |
| External appearance |  | Good | Good | Bad (Convex phenomenon and generation of striped pattern) | Bad (Convex phenomenon and generation of striped pattern) |
| Light transmittance (%) |  | 43.877 | 43.237 | 39.231 | 39.512 |

As shown in Tables 2 and 3 (e.g., by the improved performance of the Examples in Table 2 compared to the Comparative Examples in Table 3), the optical film according to embodiments of the present disclosure may improve the front contrast ratio and the side contrast ratio, lower the reflectance, have increase light transmittance, and lower the degree of the skin (side) color shift. In particular, the optical film according to embodiments of the present disclosure may allow the front contrast ratio to be greater than 70% and the reflectance to be less than 5%. Since each layer is well cured and dyes are well dissolved and mixed, the optical film may have a good external appearance.

Accordingly, embodiments of the present disclosure provide an optical film that is capable of improving a front contrast ratio and lowering reflectance. The present disclosure provides an optical film that is capable of lowering a degree of a side color shift and increasing a viewing angle. The present disclosure provides an optical film that has an excellent external appearance because a composition for a high refractive index layer is well cured and dyes are well dissolved and mixed in a high refractive index resin. The present disclosure provides an optical film that has an excellent external appearance because a composition for a low refractive index layer is well cured and dyes are well dissolved and mixed in a low refractive index resin. The present disclosure provides an optical film that is capable of lowering light leakage to a side surface and improving a black mode contrast ratio by reducing light that is emitted to the side surface in black mode. The present disclosure provides an optical film that includes a second resin layer that improves brightness and has high light transmittance despite including a dye. The present disclosure provides a polarizing plate and an optical display device, each including the optical film of the present disclosure, and being capable of improving a side contrast ratio, lowering reflectance, and increasing black visibility.

In contrast, an external appearance of Comparative Example 3 and Comparative Example 4 including carbon black is poor, a high degree of a side color shift thereof is high, and panel reflectance thereof is high, and thus, black visibility thereof is low. In addition, referring to FIG. 4 (which shows a cross-sectional scanning electron microscope (SEM) image of an optical film for improving a contrast ratio according to Comparative Example 4), when the carbon black (spherical element in FIG. 4) is included, the carbon black does not match the optical pattern size, and thus, the effects of the present disclosure cannot be obtained.

As used herein, the terms "use", "using", and "used" may be considered synonymous with the terms "utilize", "utilizing", and "utilized", respectively.

As used herein, the terms "substantially", "about", and similar terms are used as terms of approximation and not as terms of degree, and are intended to account for the inherent deviations in measured or calculated values that would be recognized by those of ordinary skill in the art.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While one or more example embodiments have been described with reference to the drawings, it will be understood by those of ordinary skill in the art that various changes in form and details may be made therein without departing from the spirit and scope of the present disclosure as defined by the following claims and equivalents thereof.

What is claimed is:

1. An optical film comprising:
a protective layer; and
a contrast ratio improvement layer comprising a first resin layer and a second resin layer facing the first resin layer, the second resin layer and the first resin layer being sequentially stacked from a lower surface of the protective layer,
wherein the second resin layer has a refractive index greater than that of the first resin layer,
the first resin layer has a patterned portion with at least two embossed optical patterns and flat sections between and immediately adjacent to the embossed optical patterns, the patterned portion being in at least some region of the first resin layer facing the second resin layer and satisfying Expression 1,
a corresponding one of the embossed optical patterns has a base angle (θ) of about 75° to about 90°,
the first resin layer optionally comprises a metal complex salt dye and/or an organic black dye, and
the second resin layer comprises the metal complex salt dye and/or the organic black dye, the metal complex salt dye comprising a black dye in an absence of the organic black dye:

$$1 < P/W \leq 10, \quad \text{Expression 1}$$

wherein, in Expression 1,
P is a pitch (unit: μm) of the patterned portion, and
W is a maximum width (unit: μm) of the corresponding one of the embossed optical patterns, and
wherein the second resin layer has a light transmittance of about 50% to about 92% at a wavelength of 550 nm.

2. The optical film of claim 1, wherein the metal complex salt dye and/or the organic black dye is comprised in an amount of about 0.01 wt % to about 10 wt % in the second resin layer.

3. The optical film of claim 1, wherein the metal complex salt dye and/or the organic black dye is comprised in an amount of about 0.01 wt % to about 10 wt % in the first resin layer.

4. The optical film of claim 1, wherein the metal complex salt dye and/or the organic black dye has an average particle diameter (D50) of about 1 nm to about 100 nm.

5. The optical film of claim 1, wherein the metal complex salt dye is the black dye, and the metal complex salt dye contains chromium (Cr), nickel (Ni), cobalt (Co), or copper (Cu).

6. The optical film of claim 5, wherein the black dye contains chromium.

7. The optical film of claim 1, wherein the metal complex salt dye is a metal azo-based dye.

8. The optical film of claim 1, wherein the metal complex salt dye is an azo-based dye having a $C_6$-$C_{20}$ monocyclic or multicyclic aromatic functional group.

9. The optical film of claim 1, wherein the metal complex salt dye is an azo-based dye containing chromium and having a $C_6$-$C_{20}$ monocyclic or multicyclic aromatic functional group, has an average particle diameter (D50) of about 1 nm to about 100 nm, and is comprised in an amount of about 0.01 wt % to about 10 wt % with respect to a total weight of the first resin layer.

10. The optical film of claim 1, wherein the metal complex salt dye is an azo-based dye containing chromium and having a $C_6$-$C_{20}$ monocyclic or multicyclic aromatic functional group, has an average particle diameter (D50) of about 1 nm to about 100 nm, and is comprised in an amount of about 0.01 wt % to about 10 wt % with respect to a total weight of the second resin layer.

11. The optical film of claim 1, wherein the organic black dye comprises a first dye having a maximum absorption wavelength of about 430 nm to about 450 nm, a second dye having a maximum absorption wavelength of about 510 nm to about 530 nm, and a third dye having a maximum absorption wavelength of about 590 nm to about 610 nm.

12. The optical film of claim 11, wherein each of the first dye, the second dye, and the third dye comprises an azo-based dye.

13. The optical film of claim 11, wherein the first dye is represented by Formula 1, the second dye is represented by Formula 2, and the third dye is represented by Formula 3:

Formula 1

Formula 2

Formula 3

14. The optical film of claim 1, wherein the first resin layer is adhesive.

15. The optical film according to claim 1, wherein at least one of the embossed optical patterns has a trapezoidal, a rectangular, or square-shaped cross-sectional shape.

16. The optical film of claim 1, wherein, when a space between a corresponding one of the embossed optical patterns and an immediately adjacent embossed optical pattern is defined as a first zone in the second resin layer, and
a space between a virtual surface connecting first surfaces, which are top surfaces of the embossed optical patterns spaced apart from each other, and a lower surface of the protective layer is defined as a second zone in the second resin layer,
the metal complex salt dye and/or the organic black dye is comprised in both the first zone and the second zone.

17. The optical film of claim 1, wherein, when a space between the corresponding one of the embossed optical patterns and an immediately adjacent embossed optical pattern is defined as a first zone in the second resin layer, and

- a space between a virtual surface connecting first surfaces, which are top surfaces of the embossed optical patterns spaced apart from each other, and a lower surface of the protective layer is defined as a second zone in the second resin layer,
- the metal complex salt dye and/or the organic black dye is comprised in the first zone and not comprised in the second zone.

18. A polarizing plate comprising:

a polarizing film; and the optical film of claim 1, the optical film being on a light exit surface of the polarizing film.

19. A liquid crystal display apparatus comprising the polarizing plate of claim 18.

\* \* \* \* \*